United States Patent [19]
Ashworth et al.

[11] Patent Number: 6,075,852
[45] Date of Patent: Jun. 13, 2000

[54] TELECOMMUNICATIONS SYSTEM AND METHOD FOR PROCESSING CALL-INDEPENDENT SIGNALLING TRANSACTIONS

[75] Inventors: Mark Ashworth; Iain Alexander Donaldson, both of Maidenhead, United Kingdom

[73] Assignee: Nortel Networks Corporation, Montreal, Canada

[21] Appl. No.: 08/875,473

[22] PCT Filed: Feb. 9, 1996

[86] PCT No.: PCT/GB96/00303

§ 371 Date: Jul. 9, 1997

§ 102(e) Date: Jul. 9, 1997

[87] PCT Pub. No.: WO96/25013

PCT Pub. Date: Aug. 15, 1996

[30] Foreign Application Priority Data

Feb. 10, 1995 [GB] United Kingdom .................... 9502634

[51] Int. Cl.[7] ...................................... H04M 3/42
[52] U.S. Cl. ......................... 379/201; 379/207; 379/219; 379/229; 379/230; 379/231; 379/232; 379/233; 379/234
[58] Field of Search ...................................... 379/207, 196, 379/211, 219, 220, 221, 229, 230, 242, 231, 232, 233, 234

[56] References Cited

U.S. PATENT DOCUMENTS

| 5,253,288 | 10/1993 | Frey et al. | 379/221 |
|---|---|---|---|
| 5,615,253 | 3/1997 | Kocan et al. | 379/196 |
| 5,691,973 | 11/1997 | Ramström et al. | 379/242 |
| 5,917,901 | 6/1999 | Maxwell et al. | 379/229 |

*Primary Examiner*—Krista Zele
*Assistant Examiner*—Bing Bui
*Attorney, Agent, or Firm*—Lee, Mann, Smith, McWilliams, Sweeney & Ohlson

[57] ABSTRACT

A telecommunications system incorporates a switch based private network having a transparent network signalling system and having a plurality of nodes interfacing each via a switch with an intelligent public network. The public network incorporates a service control point having associated therewith a database containing destination addresses corresponding to call numbers received from the private network. The database provides routing data for call independent signalling information in response to requests from a node on behalf of a private service provided to a user of that node and from a public network switch on behalf of a private service provided to a directly connected user of that switch.

4 Claims, 2 Drawing Sheets

TELECOMMUNICATIONS SYSTEM AND METHOD FOR PROCESSING CALL-INDEPENDENT SIGNALLING TRANSACTIONS

This application is the national filing of international application No. PCT/GB96/00303, filed Feb. 9, 1996.

FIELD OF THE INVENTION

This invention relates to telecommunications, e.g. telephone systems and in particular to systems incorporating one or more private networks.

BACKGROUND TO THE INVENTION

A conventional telecommunications private network comprises a number of private exchanges or switches (PBX's) interconnected via private telephone lines and each of which serves a number of telephone or user terminals. The PBX's of the private system are interconnected by private leased lines which are installed by the appropriate telephone service supplier. Call routing and call handling within the private network are controlled via the PBX's.

In addition to a basic telephony service (POTS) a private network is generally required to provide additional features such as call forwarding, call transfer, ring-back when free and conference calls. These features are not in general provided on a public network as they are specific requirements of business rather than domestic subscribers.

A further service that is finding increasing usage is that of providing a direct dialling facility to telephone extensions attached to a PBX. For example the CENTREX system provides such a service.

An approach to the problem of integrating public and private networks is described in specification No. WO 93/15583 which relates to a method of providing system and network independent dedicated private circuit telecommunications functionality using separate signalling and transmission network bearers.

The provision of private leased lines represents a significant capital investment by the telephone service supplier. Furthermore these leased lines represent an underused asset as they are in significant use, for only a part, typically about one third, of the twenty four hour cycle. However, during their idle period, these lines are not available to carry telephone traffic, e.g. to reduce an overload, for subscribers other than the private user to whom the lines have been leased. Expansion of the network is also difficult, as new dedicated lines have to be provided for new business subscribers. Various workers have addressed this problem by providing systems in which a private network comprises a number of local networks interconnected by non-dedicated public network paths. This however introduces the problem that certain features provided on the private network may not be available on the public network and there is thus a need to provide feature transparency for private network calls routed across the public network, i.e. to provide private network users with the perception that their network comprises a single seamless network.

OBJECT OF THE INVENTION

An object of the invention is to minimise or to overcome the above disadvantage.

It is a further object of the invention to provide a system in which calls between private network users are routed via a public network while providing private network feature transparency.

SUMMARY OF THE INVENTION

According to the invention there is provided a telecommunications system incorporating a switch based private network having a transparent network signalling system and having a plurality of nodes interfacing each via a switch with an intelligent public network, communication in use being effected between the nodes via the public network, wherein the public network incorporates a service control point having associated therewith a database containing destination addresses corresponding to call numbers received from the private network, in response to requests from a said node on behalf of a private service provided to a user of that node and from a public network switch on behalf of a private service provided to a directly connected user of that switch, characterised in that a call forwarding facility is provided, and that said database has means responsive to an indication from the network that a signalling transaction is call independent for inhibiting the call forwarding facility for that transaction.

According to a further aspect of the invention there is provided a method of routing call independent signalling information in telecommunications system incorporating a switch based private network having a transparent network signalling system and having a plurality of nodes interfacing each via a switch with an intelligent public network controlled by a service control point having a database associated therewith, the method being characterised by sending to the database requests for call independent signalling information from a said node on behalf of a private service provided to a user associated with that node or from a said switch on behalf of a private service provided to a user directly connected to that switch, providing from the database network destination information responsive to said requests whereby to determine routing data, and suppressing call forwarding information for destination information requests relating to a said call independent signalling transaction.

Routing of calls within the public network is effected using switch and trunk identifiers and not subscriber numbers. The arrangement permits the routing of private network virtual calls, i.e. call independent signalling connections requested by a connected private network node.

The feature transparency is split into two aspects. These are the call related transparency of real calls and the call independent transparency of virtual calls.

BRIEF DESCRIPTION OF THE DRAWINGS

An embodiment of the invention will now be described with reference to the accompanying drawings in which.

DETAILED DESCRIPTION OF INVENTION

Figure 1:
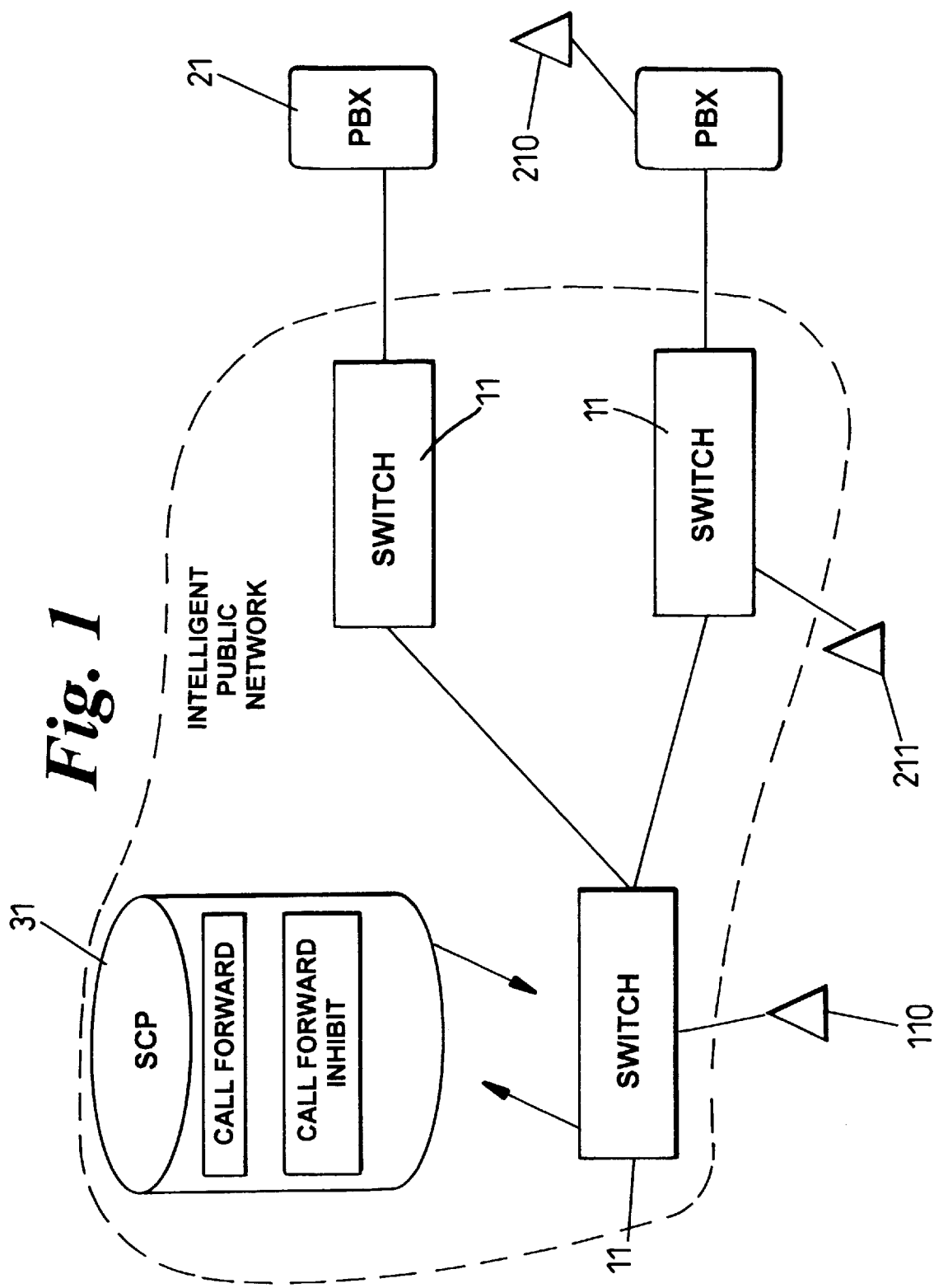
FIG. 1 is a schematic diagram of a telecommunications system according to the invention.
Figure 2:
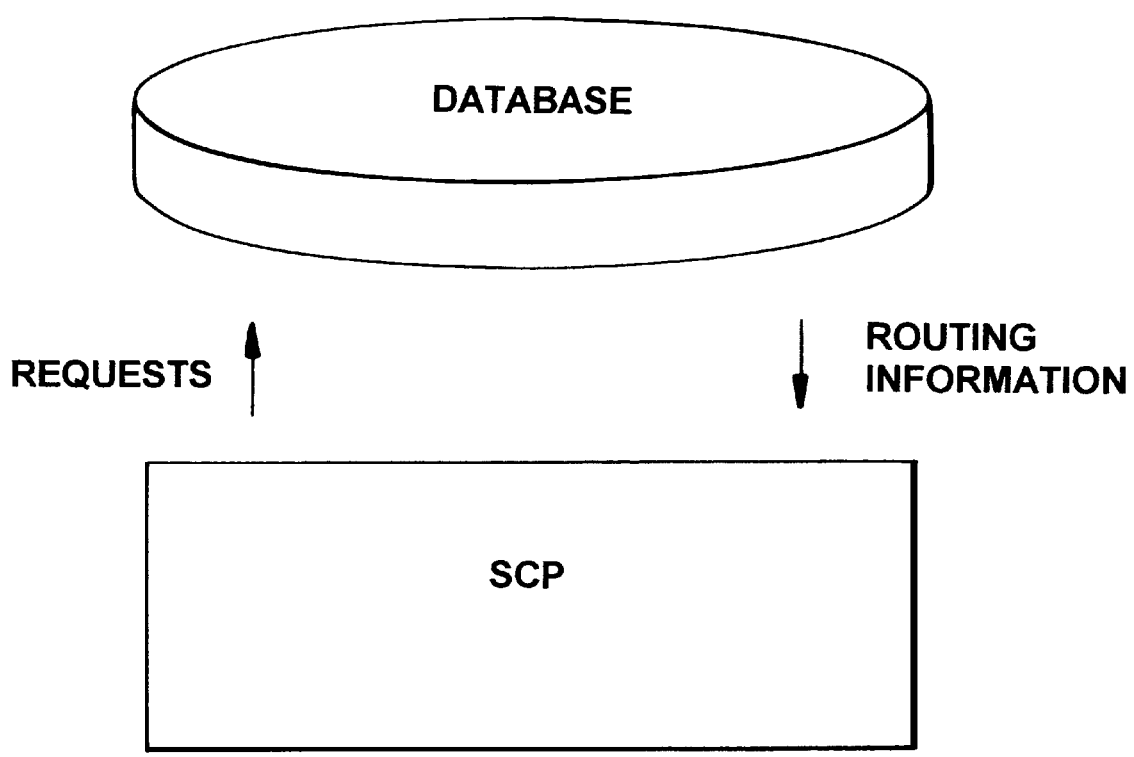
FIG. 2 is a schematic diagram of a service control point for use in the system of FIG. 1.

Referring to the drawings, the telecommunications system includes a public network comprising a plurality of nodes or switching centres 11 at least some of which are associated with a corresponding plurality of public network subscriber terminals 110. Some of the switching centres 11 also provide an interface between corresponding private network nodes 21 and the public network. Each private network node 21 may in turn service a number of private network terminals 210. The private network incorporates a signalling system that has transparency on a fundamental part. The signalling system may be, for example, DPNSS (Digital Private Network Signalling System) or QSIG (Signalling at the 'Q' reference point). This signalling system provides the private network with service/feature facilities that are not necessarily provided by the public network. A switch 11 may also support individual private network customers 211 directly rather than via a PBX.

In the intelligent network outlined above, certain functions, e.g. the addressing capabilities of the network are centralised in a service control point (SCP) 31 incorporating a database and services are provided via interaction of the switch 11 with the SCP. In this arrangement, the switch 11 requests the database via the SCP 31 for the destination address of all calls made on the network so that the full numbering plan and routing table is stored in the database. The routing is effected using switch and trunk identifiers rather than numbers. Therefore, virtual calls, i.e. call independent signalling connections requested by a connected private switch, have to be routed under the control of the SCP. In addition to providing call routing information, the SCP 31 also provides a map for the translation of relevant private call signalling information to corresponding public network signalling information.

In the arrangement of FIG. 1, the switch based private network is not required to have the intelligent network capabilities of the public network and is provided with its own private numbering/routing plan. The private network does however have a signalling system that has transparency as a fundamental part, e.g. the DPNSS or QSIG standard, which uses call independent signalling as part of the service/feature requirements. The public network provides a VPN (virtual private network) service to private switches and may have directly connected business subscribers who require feature functionality towards private switches from the same customer. The public network uses its intelligence as an integral or an exclusive means to determine network destinations and provides transparency based e.g. on DFT (DPNSS feature transparency).

The SCP and its associated database respond to queries for routing of call independent signalling information from requests for signalling information received from a connected PBX (directly or indirectly) on behalf of a private service provided to a user on that PBX, and from a public switch on behalf of a private service provided to a directly connected user on that switch. This encompasses both connectionless (packet) and connection oriented signalling information that is independent of a call. For call independent signalling transactions, the network informs the SCP of the nature of the query. As a result, the database then avoids treating the destination address in the same manner as that for a subscriber, i.e. the address would not be subject to call forwarding settings should it coincide with a real address of a user whose call forwarding is active.

The service may be billed to the private network operator, who for this purpose can be considered as a public network customer, in a number of ways, including per octet/bit of signalling information carried, per signalling packet carried (independent of length up to a network supportable maximum), on a rental basis, or on a call (for call related) or connection (for call independent) basis. The billing may be indicated by the database in response to the initial enquiry.

What is claimed is:

1. A telecommunications system incorporating a switch based private network having a transparent network signalling system and having a plurality of nodes each interfacing via a switch with an intelligent public network, communication in use being effected between the private network nodes via the public network, wherein the public network incorporates a service control point having associated therewith a database containing destination addresses corresponding to call numbers received from the private network, in response to requests from a said private network node on behalf of a private service provided to a user of that node and from a public network switch on behalf of a private service provided to a directly connected user of that switch, characterised in that a call forwarding facility is provided by the service control point, and that said database has means responsive to an indication from the private network that a signalling transaction is call independent for inhibiting the call forwarding facility for that transaction.

2. A telecommunications system as claimed in claim 1, characterised in that said transparent network signalling system comprises a DPNSS (Digital Private Network Signalling System) or a QSIG (Signalling at the 'Q' reference point) protocol.

3. A method of routing call independent signalling information in telecommunications system incorporating a switch based private network having a transparent network signalling system and having a plurality of nodes each interfacing via a switch with an intelligent public network controlled by a service control point having a database associated therewith, the method being characterised by sending to the database requests for call independent signalling information from a said private network node on behalf of a private service provided to a private network user associated with that node or from a said switch on behalf of a private service provided to a private network user directly connected to that switch, providing from the database network destination information responsive to said requests whereby to determine routing data, and suppressing call forwarding information for destination information requests relating to said requests for call independent signalling information.

4. A method as claimed in claim 3, characterised in that said routing is determined by switch and trunk identifiers.

* * * * *